(No Model.)
C. B. PERRY.
ADJUSTABLE HAME HOOK.
No. 565,501. Patented Aug. 11, 1896.
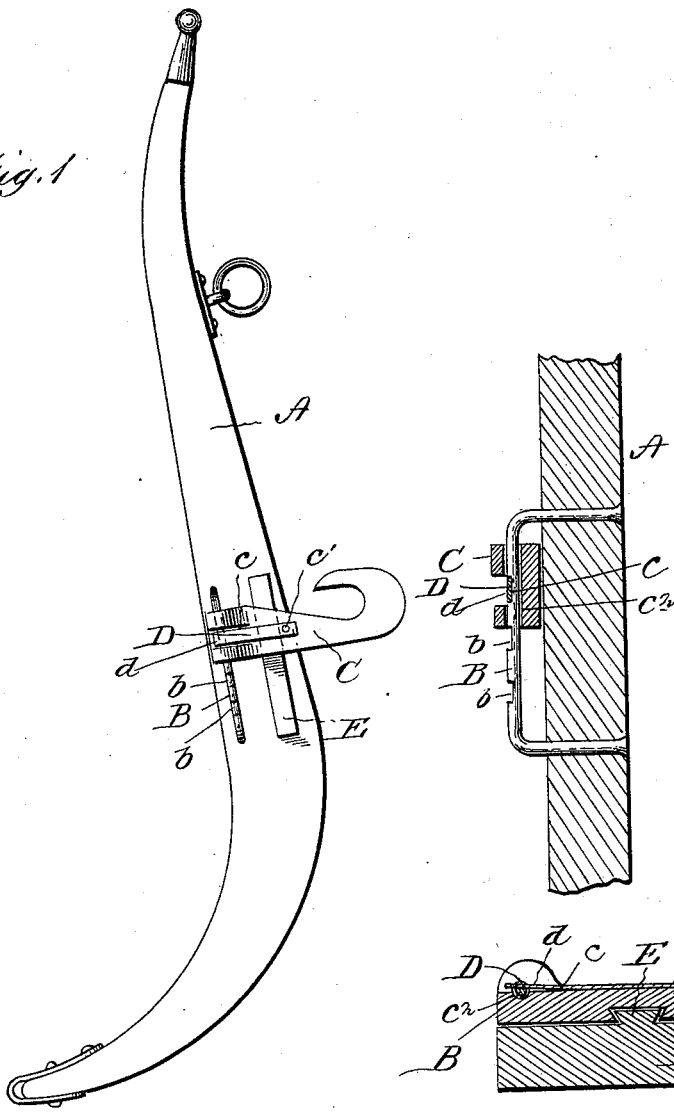
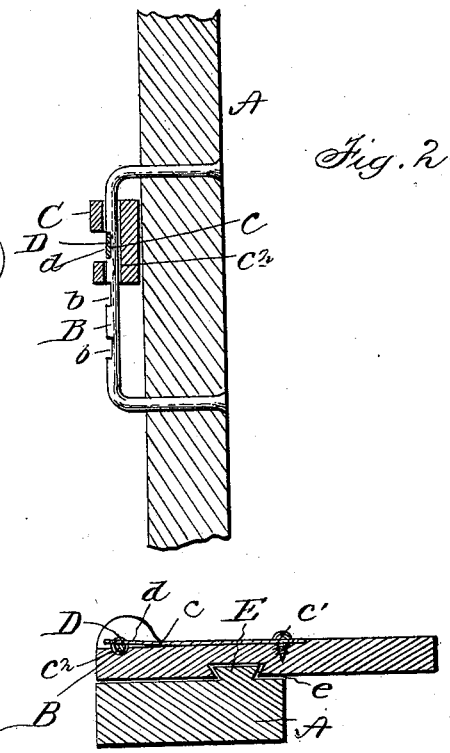
Witnesses.
Inventor.
Carr B. Perry.

UNITED STATES PATENT OFFICE.

CARR B. PERRY, OF BEST, OHIO.

ADJUSTABLE HAME-HOOK.

SPECIFICATION forming part of Letters Patent No. 565,501, dated August 11, 1896.

Application filed April 28, 1896. Serial No. 589,431. (No model.)

*To all whom it may concern:*

Be it known that I, CARR B. PERRY, a citizen of the United States, residing at Best, in the county of Adams and State of Ohio, have invented certain new and useful Improvements in Adjustable Hame-Hooks; and I do declare the following to be a full, clear, and exact description of the invention, such as will enable others skilled in the art to which it appertains to make and use the same.

My invention has relation to hames for harness; and the object is to provide a simple device of this kind whereby the hame-hook can be adjusted to suit the draft of an animal after the hame and collar have been lifted, and can also be adjusted to suit the draft of different animals; and to this end the novelty consists in the construction, combination, and arrangement of the same, as will be hereinafter more fully described, and particularly pointed out in the claims.

In the accompanying drawings the same letters of reference indicate like parts of the invention.

Figure 1 is a front view of a hame with my improved hook attached thereto. Fig. 2 is a vertical section on the line of the staple, and Fig. 3 is a transverse section through the line *x x* of Fig. 1.

A represents one of the hames, and it is provided with the rigid staple B, upon which is pivoted the hame or trace hook C. This staple is provided with a series of transverse recesses *b*, and the face of the hook C has a longitudinal recess *c*, in which is located the free end *d* of a leaf-spring D, secured to the face of the hook C by a screw or rivet *c'*. The recess *c* is formed by cutting away a central portion of the base of the hook C, into and communicating with the vertical hole $c^2$, through which the staple B passes, and the free end *d* of the spring D, lying in the recess *c*, engages one of the recesses *b* on the staple B and holds said hook in a vertical position at whatever point it may be adjusted to, and by this means it will be seen that there is considerable latitude in which the hook C, to which the tugs or traces are attached, may be varied to secure the proper point to secure the best effect and greatest comfort to the animal when at work.

E is a vertical rib on the hame parallel with and of a length corresponding to the length of the staple B, and said rib engages a vertical groove *e* on the back side of the hook. This arrangement preserves the relative arrangement of the parts, and the groove and rib serve to keep the hook horizontal and prevent undue wear and strain on the staple.

Having thus described my invention, what I claim, and desire to secure by Letters Patent of the United States, is—

1. In a hame provided with a vertical staple, having a series of retaining-recesses, the combination with a hook pivoted upon said staple and provided with a recess in which is located a leaf-spring, secured to said hook and adapted to engage the recesses in said staple, substantially as and for the purpose specified.

2. In a hame, provided with the vertical staple B, having a series of recesses *b*, the combination with the hook C hinged to said staple and a spring D, the free end *d* of which is located in a recess *c* and engages one of the recesses *b* on the staple B, substantially as and for the purpose specified.

3. The hame A, having the rigid staple B and rib E, in combination with the hook C having groove *e* and spring D, the free end *d* of which lies in the recess *c* and engages one of the recesses *b* on the staple B, substantially as and for the purpose specified.

In testimony whereof I hereunto affix my signature in presence of two witnesses.

CARR B. PERRY.

Witnesses:
J. B. ALEXANDER,
EVA E. ALEXANDER.